United States Patent
Chun et al.

(10) Patent No.: US 9,716,576 B2
(45) Date of Patent: Jul. 25, 2017

(54) METHOD AND DEVICE FOR TRANSMITTING REFERENCE SIGNAL IN WIRELESS COMMUNICATION SYSTEM

(71) Applicant: LG ELECTRONICS INC., Seoul (KR)

(72) Inventors: Jin Young Chun, Anyang-si (KR); Bin Chul Ihm, Anyang-si (KR); Ji Won Kang, Anyang-si (KR); Ki Tae Kim, Anyang-si (KR); Sung Ho Park, Anyang-si (KR); Su Nam Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 247 days.

(21) Appl. No.: 14/359,266

(22) PCT Filed: Dec. 5, 2012

(86) PCT No.: PCT/KR2012/010465
§ 371 (c)(1),
(2) Date: May 19, 2014

(87) PCT Pub. No.: WO2013/085271
PCT Pub. Date: Jun. 13, 2013

(65) Prior Publication Data
US 2014/0321414 A1    Oct. 30, 2014

Related U.S. Application Data

(60) Provisional application No. 61/567,133, filed on Dec. 6, 2011.

(51) Int. Cl.
*H04L 5/00* (2006.01)

(52) U.S. Cl.
CPC .......... *H04L 5/0051* (2013.01); *H04L 5/0023* (2013.01); *H04L 5/0048* (2013.01); *H04L 5/0053* (2013.01); *H04L 5/0044* (2013.01)

(58) Field of Classification Search
USPC ....................................................... 370/329
See application file for complete search history.

(56) References Cited

U.S. PATENT DOCUMENTS

2009/0023451 A1   1/2009  Pan et al.
2011/0194536 A1*  8/2011  Kim ..................... H04L 5/0023
                                                        370/335

(Continued)

FOREIGN PATENT DOCUMENTS

EP         2378703         10/2011
KR    10-2010-0020411       2/2010

(Continued)

OTHER PUBLICATIONS

PCT International Application No. PCT/KR2012/010465, Written Opinion of the International Searching Authority dated Jan. 31, 2013, 1 page.

(Continued)

*Primary Examiner* — Jamal Javaid
*Assistant Examiner* — Kyaw Z Soe
(74) *Attorney, Agent, or Firm* — Lee Hong Degerman Kang Waimey

(57) ABSTRACT

The present invention relates to a method and device for decoding a channel in a wireless communication system. User equipment receives, from a base station, a candidate group of antenna ports including a plurality of antenna ports, and receives a reference signal from the base station onto enhanced physical downlink control channel (e-PDCCH) ports that correspond to all or some of the plurality of antennas in the candidate group of antenna ports. The user (Continued)

equipment blind-decodes the e-PDCCH configured in a physical downlink shared channel (PDSCH), on the basis of the received reference signal.

9 Claims, 17 Drawing Sheets

(56) References Cited

U.S. PATENT DOCUMENTS

| | | | |
|---|---|---|---|
| 2011/0268062 A1* | 11/2011 | Ji | H04L 5/0055 370/329 |
| 2013/0034064 A1* | 2/2013 | Nam | H04W 72/1294 370/329 |
| 2013/0044692 A1* | 2/2013 | Nory | H04L 25/0228 370/329 |
| 2013/0044727 A1* | 2/2013 | Nory | H04L 5/0092 370/330 |
| 2013/0064216 A1* | 3/2013 | Gao | H04L 5/0016 370/330 |
| 2013/0107861 A1* | 5/2013 | Cheng | H04W 72/042 370/331 |
| 2013/0188558 A1* | 7/2013 | Nam | H04W 24/02 370/328 |
| 2013/0242855 A1* | 9/2013 | Kim | H04J 11/005 370/315 |

FOREIGN PATENT DOCUMENTS

| | | | | |
|---|---|---|---|---|
| KR | WO 2011132988 A2 * | 10/2011 | | H04B 7/155 |
| KR | 10-2011-0126034 | 11/2011 | | |

OTHER PUBLICATIONS

Panasonic, "Considerations on search space design for enhanced PDCCH," 3GPP TSG RAN WG1 Meeting #67, R1-113816, Nov. 2011, 3 pages.

Samsung, "DM-RS based Distributed and Localized E-PDCCH structure," 3GPP TSG RAN WG1 #67, R1-114239, Nov. 2011, 4 pages.

Korean Intellectual Property Office Application Serial No. 10-2014-7014074, Office Action dated Jul. 20, 2015, 4 pages.

* cited by examiner

METHOD AND DEVICE FOR TRANSMITTING REFERENCE SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2012/010465, filed on Dec. 5, 2012, which claims the benefit of U.S. Provisional Application Ser. No. 61/567,133, filed on Dec. 6, 2011, the contents of which are hereby incorporated by reference herein in their entirety.

BACKGROUND OF THE INVENTION

Field of the Invention

The present invention relates to wireless communications, and more particularly, a method and apparatus for transmitting a reference signal in a wireless communication system.

Related Art

The next-generation multimedia wireless communication systems which are recently being actively researched are required to process and transmit various pieces of information, such as video and wireless data as well as the initial voice-centered services. The 4$^{th}$ generation wireless communication systems which are now being developed subsequently to the 3$^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler Effect resulting from the mobility of a user equipment. A variety of techniques are being developed in order to overcome the abnormal characteristics of the wireless channel and to increase the reliability of wireless communication.

Meanwhile, with the employment of machine-to-machine (M2M) communication and with the introduction and distribution of various devices such as a smart phone, a table personal computer (PC), etc., a data requirement size for a cellular network is increased rapidly. To satisfy a high data requirement size, various techniques are under development. A carrier aggregation (CA) technique, a cognitive radio (CR) technique, or the like for effectively using more frequency bands are under research. In addition, a multiple antenna technique, a multiple base station cooperation technique, or the like for increasing data capacity within a limited frequency are under research. That is, eventually, the wireless communication system will be evolved in a direction of increasing density of nodes capable of accessing to an area around a user. A wireless communication system having nodes with higher density can provide a higher performance through cooperation between the nodes. That is, a wireless communication system in which each node cooperates has a much higher performance than a wireless communication system in which each node operates as an independent base station (BS), advanced BS (ABS), node-B (NB), eNode-B (eNB), access point (AP), etc.

A distributed multi-node system (DMNS) comprising a plurality of nodes within a cell may be used to improve performance of a wireless communication system. The DMNS may include a distributed antenna system (DAS), a radio remote head (RRH), and so on. Also, standardization work is underway for various multiple-input multiple-output (MIMO) techniques and cooperative communication techniques already developed or applicable in a future so that they can be applied to the DMNS. Link quality is expected to be improved by employing the DMNS. However, introduction of a new control channel is also required for application of various MIMO techniques and cooperative techniques to the DMNS.

Accordingly, a method for decoding a new control channel for the DMNS efficiently is required.

SUMMARY OF THE INVENTION

The present invention provides a method and apparatus for transmitting a reference signal in a wireless communication system. The present invention provides a method for configuring a candidate group of reference signals for decoding a physical downlink shared channel (PDSCH) or an enhanced physical downlink control channel (e-PDCCH).

In an aspect, a method for decoding, by a user equipment, a channel in a wireless communication system is provided. The method includes receiving, from a base station, a candidate group of antenna ports including a plurality of antenna ports, receiving, from the base station, a reference signal on enhanced physical downlink control channel (e-PDCCH) ports corresponding to all or some of the plurality of antenna ports included in the candidate group of antenna ports, and performing blind decoding of an e-PDCCH, configured within a physical downlink shared channel (PDSCH) region, based on the received reference signal.

In another aspect, a method for transmitting, by a base station, a reference signal in a wireless communication system is provided. The method includes transmitting a candidate group of antenna ports including a plurality of antenna ports to a user equipment, and transmitting a reference signal to the UE on enhanced physical downlink control channel (e-PDCCH) ports corresponding to all or part of the plurality of antenna ports included in the candidate group of antenna ports.

In another aspect, a user equipment (UE) in a wireless communication system is provided. The UE includes a radio frequency (RF) unit for transmitting or receiving a radio signal, and a processor connected to the RF unit, and configured to receive, from a base station, a candidate group of antenna ports including a plurality of antenna ports, receive, from the base station, a reference signal on enhanced physical downlink control channel (e-PDCCH) ports corresponding to all or some of the plurality of antenna ports included in the candidate group of antenna ports, and perform blind decoding of an e-PDCCH, configured within a physical downlink shared channel (PDSCH) region, based on the received reference signal.

A PDSCH or an e-PDCCH can be decoded in an efficient manner.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). $3^{rd}$ generation partnership project (3GPP) long term evolution (LTE) is part of an evolved UMTS (E-UMTS) using the E-UTRA, which employs the OFDMA in downlink and the SC-FDMA in uplink. LTE-advanced (LTE-A) is an evolution of 3GPP LTE.

Hereinafter, for clarification, LTE-A will be largely described, but the technical concept of the present invention is not meant to be limited thereto.

Figure 1:
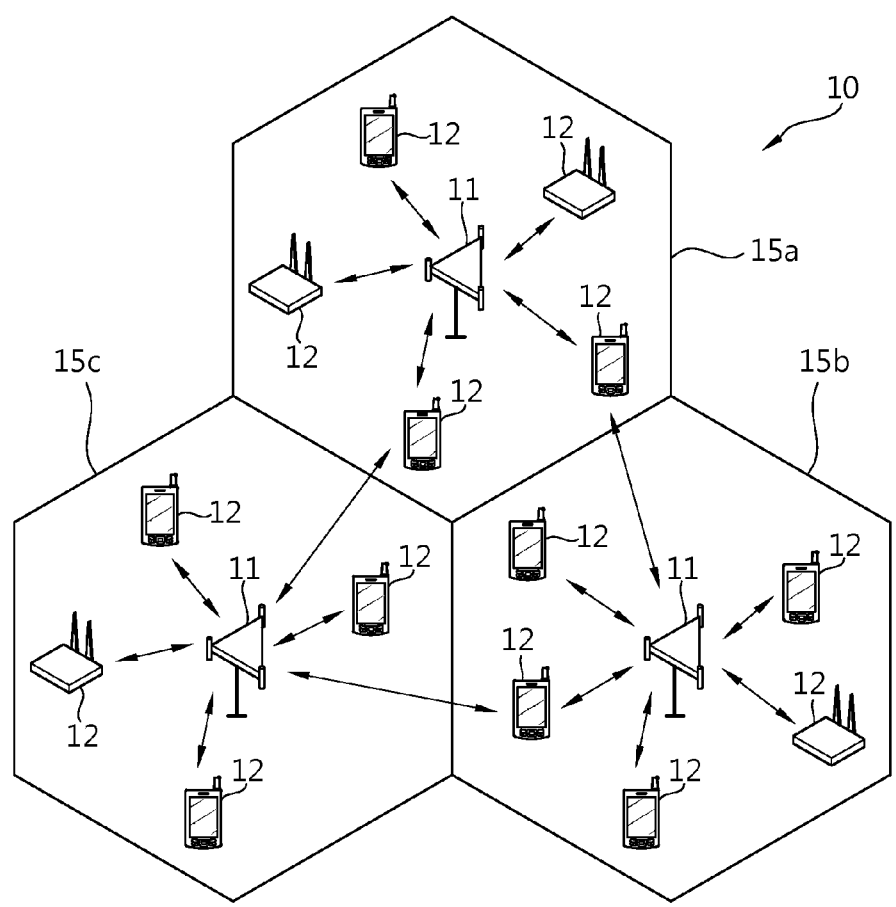
FIG. 1 shows a wireless communication system.

FIG. 1 shows a wireless communication system.

The wireless communication system 10 includes at least one base station (BS) 11. Respective BSs 11 provide a communication service to particular geographical areas 15*a*, 15*b*, and 15*c* (which are generally called cells). Each cell may be divided into a plurality of areas (which are called sectors). A user equipment (UE) 12 may be fixed or mobile and may be referred to by other names such as mobile station (MS), mobile user equipment (MT), user user equipment (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
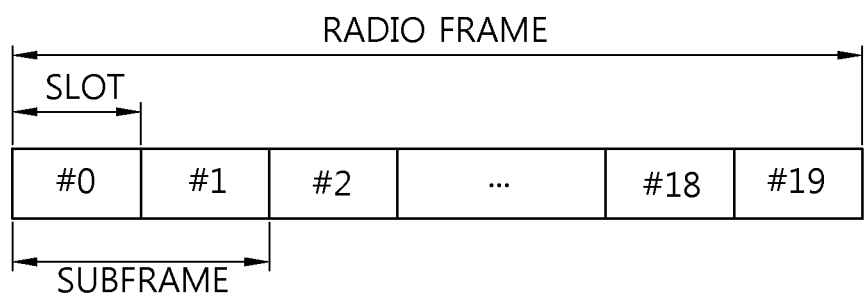
FIG. 2 shows a structure of a radio frame in 3GPP LTE.

FIG. 2 shows a structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A transmission time interval (TTI) is a basic scheduling unit for a data transmission. In 3GPP LTE, one TTI may be equal to a time taken for transmitting one subframe. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express 1.5 a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

Figure 3:
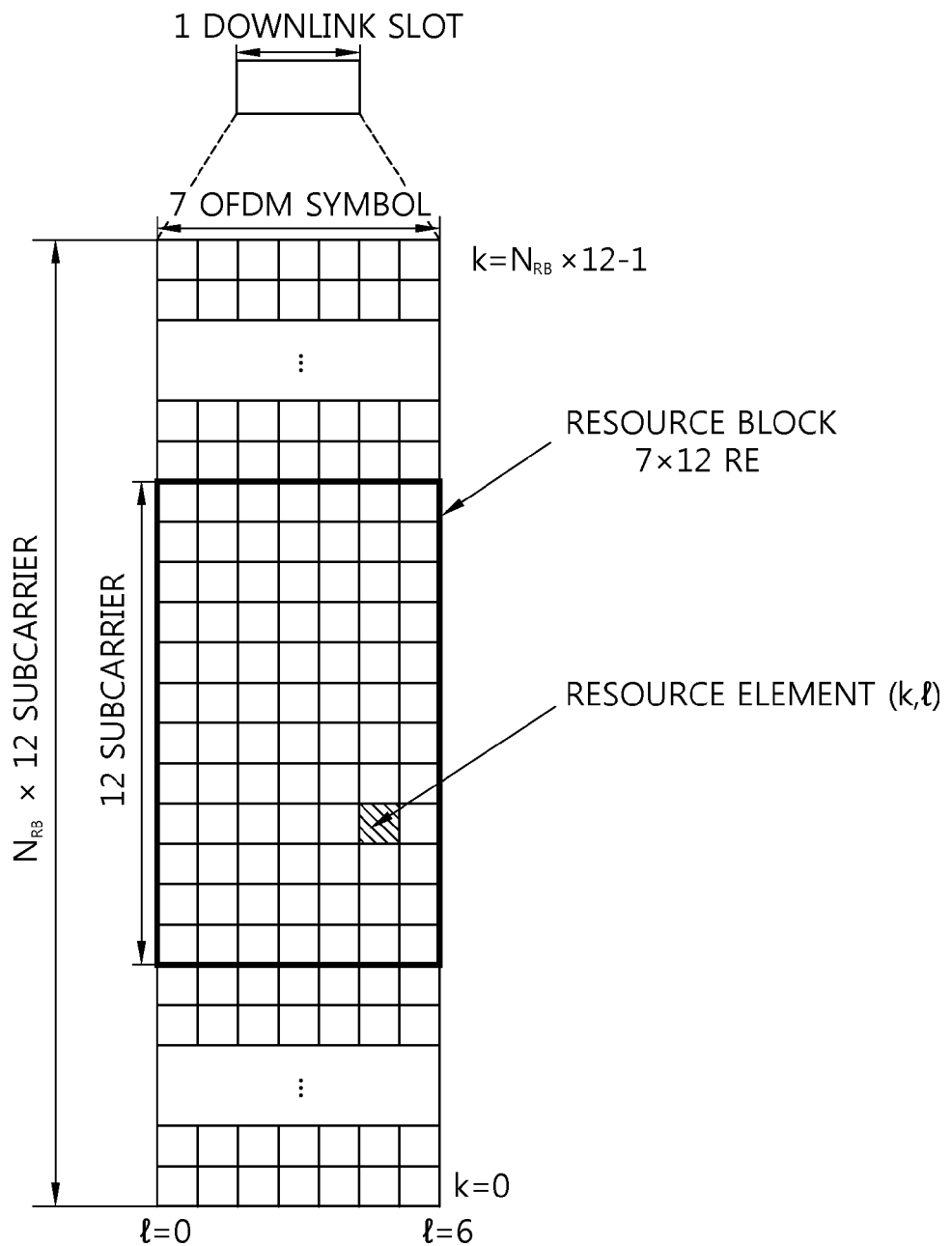
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 6 to 110. One resource block includes a plurality of subcarriers in the frequency domain. An uplink slot may have the same structure as that of the downlink slot.

Each element on the resource grid is called a resource element. The resource elements on the resource grid can be identified by a pair of indexes (k,l) in the slot. Here, k (k=0, ..., $N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a CP, frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
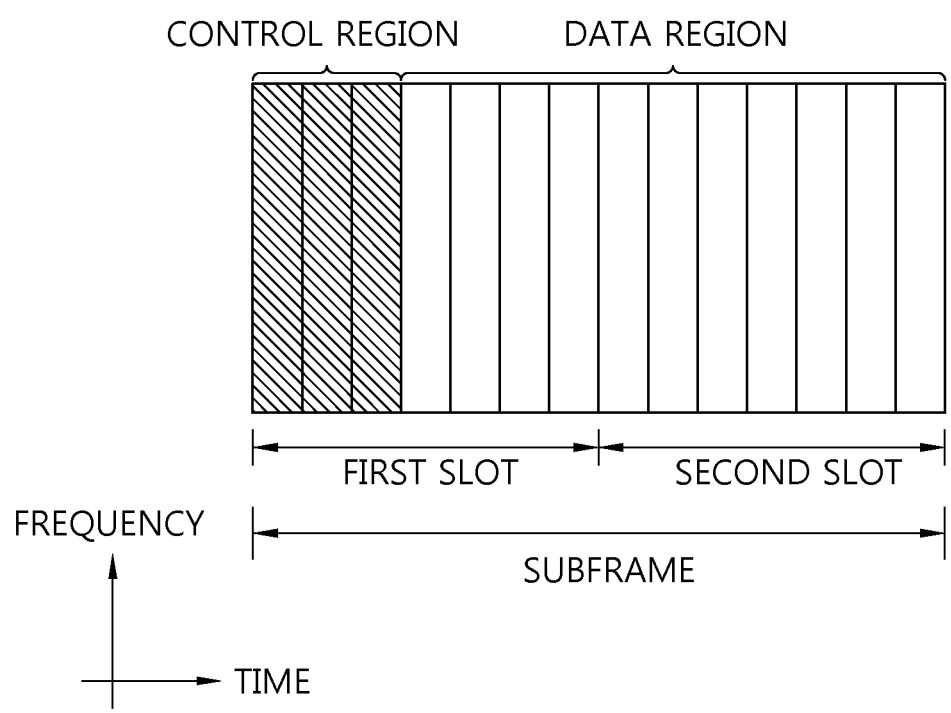
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to 9 resource element groups (REG) including respectively 4 resource elements. 4 quadrature phase shift keying (QPSK) symbols are mapped to each REG. Resource elements occupied by reference signals (RS) are not included in the REG, and the total number of REGs within a given OFDM symbol may be determined according to whether a cell-specific RS (CRS) exists. The format of the PDCCH and the number of bits of the possible PDCCH are determined according to the correlation between the number CCEs and the coding rate provided by the CCEs. The number of CCEs used for transmission of a specific PDCCH may be determined by the base station according to the channel situation. For example, the PDCCH for the UE having a superior channel state may use only one CCE. The PDCCH for the UE having an inferior channel state may need 8 CCEs in order to obtain sufficient robustness. Furthermore, the transmission power of the PDCCH may be adjusted according to the channel state. Table 1 shows supported PDCCH formats and a number of CCEs corresponding to each PDCCH format, etc.

TABLE 1

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

The BS determines a PDCCH format according to a DCI to be transmitted to the UE, and attaches a cyclic redundancy check (CRC) to the DCI. A unique radio network temporary identifier (RNTI) is scrambled or masked on the CRC according to the owner or the purpose of the PDCCH. In case of a PDCCH for a particular UE, a unique identifier, e.g., a cell-RNTI (C-RNTI), of the UE, may be scrambled on the CRC. Or, in case of a PDCCH for a paging message, a paging indication identifier, e.g., a paging-RNTI (P-RNTI), may be scrambled on the CRC. In case of a PDCCH for a system information block (SIB), a system information identifier, e.g., a system information-RNTI (SI-RNTI), may be scrambled on the CRC. In order to indicate a random access response, i.e., a response to a transmission of a random access preamble of the UE, a random access-RNTI (RA-RNTI) may be scrambled on the CRC.

Figure 5:
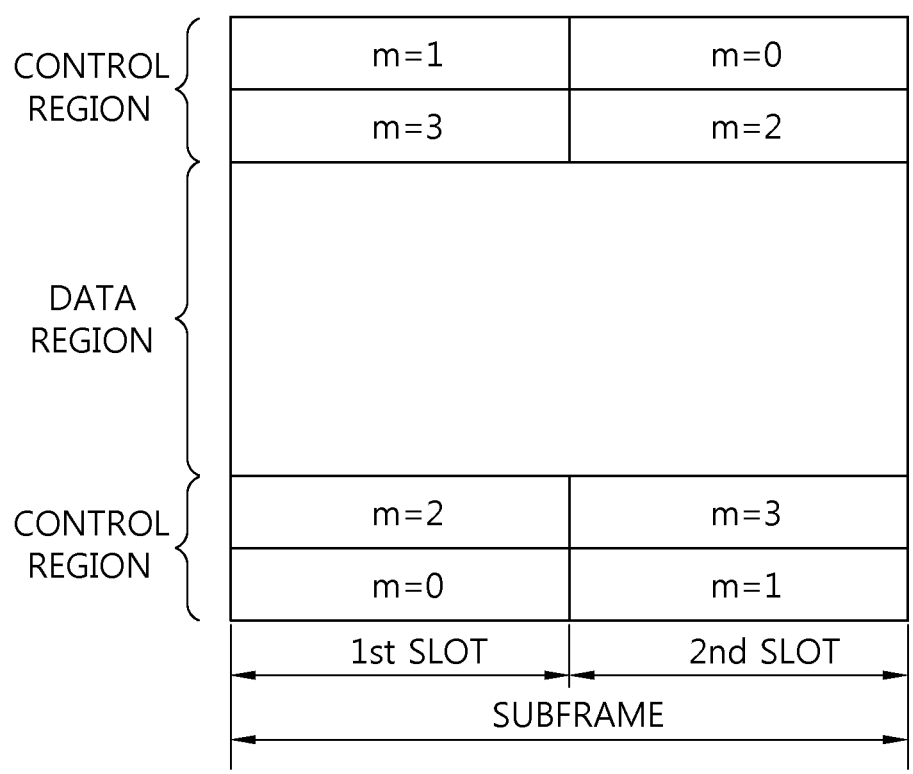
FIG. 5 shows a structure of an uplink subframe.

FIG. 5 shows a structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH for a UE is allocated by a pair of RBs in a subframe. The resource blocks belonging to the pair of RBs occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

To improve a performance of the wireless communication system, a technique is evolved in a direction of increasing density of nodes capable of accessing to an area around a user. A wireless communication system having nodes with higher density can provide a higher performance through cooperation between the nodes.

Figure 6:
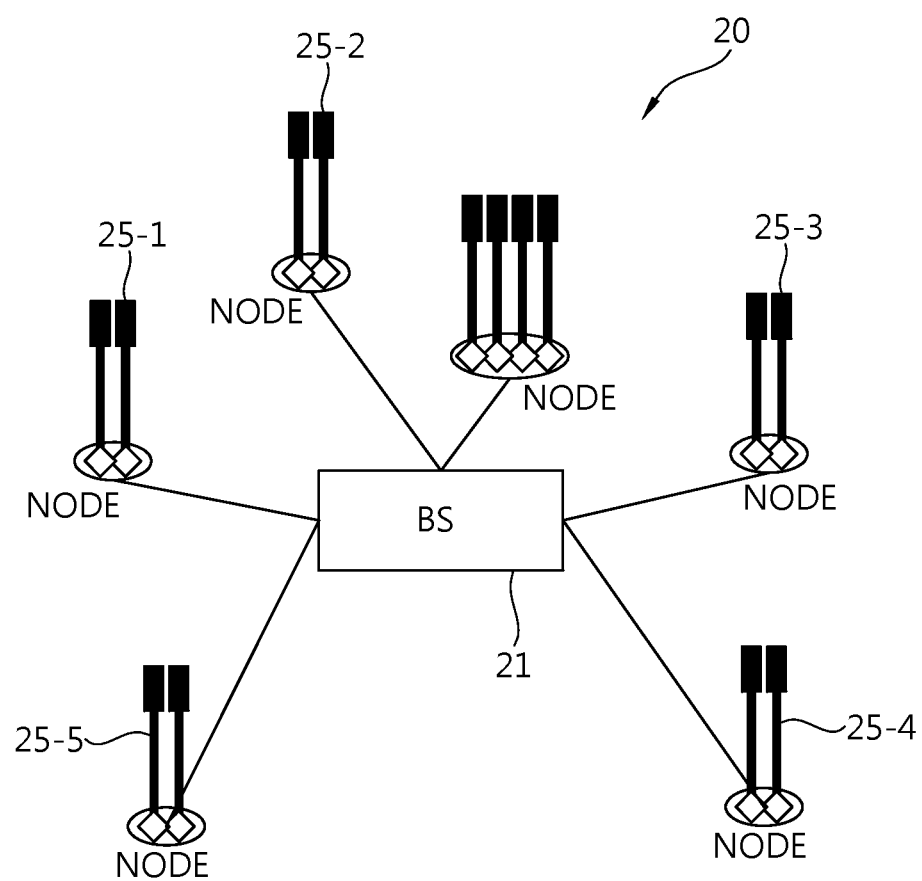
FIG. 6 shows an example of a multi-node system.

FIG. 6 shows an example of a multi-node system.

Referring to FIG. 6, a multi-node system 20 may consist of one BS 21 and a plurality of nodes 25-1, 25-2, 25-3, 25-4, and 25-5. The plurality of nodes 25-1, 25-2, 25-3, 25-4, and 25-5 may be managed by one BS 21. That is, the plurality of nodes 25-1, 25-2, 25-3, 25-4, and 25-5 operate as if they are a part of one cell. In this case, each of the nodes 25-1, 25-2, 25-3, 25-4, and 25-5 may be allocated a separate node identifier (ID), or may operate as if it is a part of an antenna group without an additional node ID. In this case, the multi-node system 20 of FIG. 6 may be regarded as a distributed multi node system (DMNS) which constitutes one cell.

Alternatively, the plurality of nodes 25-1, 25-2, 25-3, 25-4, and 25-5 may have separate cell IDs and perform a handover (HO) and scheduling of the UE. In this case, the multi-node system 20 of FIG. 6 may be regarded as a multi-cell system. The BS 21 may be a macro cell. Each node may be a femto cell or pico cell having cell coverage smaller than cell coverage of a macro cell. As such, if a plurality of cells is configured in an overlaid manner according to coverage, it may be called a multi-tier network.

In FIG. 6, each of the nodes 25-1, 25-2, 25-3, 25-4, and 25-5 may be any one of a BS, a Node-B, an eNode-B, a pico cell eNB (PeNB), a home eNB (HeNB), a remote radio head (RRH), a relay station (RS) or repeater, and a distributed antenna. At least one antenna may be installed in one node. In addition, the node may be called a point. In the following descriptions, a node implies an antenna group separated by more than a specific interval in a DMNS. That is, it is assumed in the following descriptions that each node implies an RRH in a physical manner. However, the present invention is not limited thereto, and the node may be defined as any antenna group irrespective of a physical interval. For example, the present invention may be applied by considering that a node consisting of horizontal polarized antennas and a node consisting of vertical polarized antennas constitute a BS consisting of a plurality of cross polarized antennas. In addition, the present invention may be applied to a case where each node is a pico cell or femto cell having smaller cell coverage than a macro cell, that is, to a multi-cell system. In the following descriptions, an antenna may be replaced with an antenna port, virtual antenna, antenna group, as well as a physical antenna.

Figure 7:
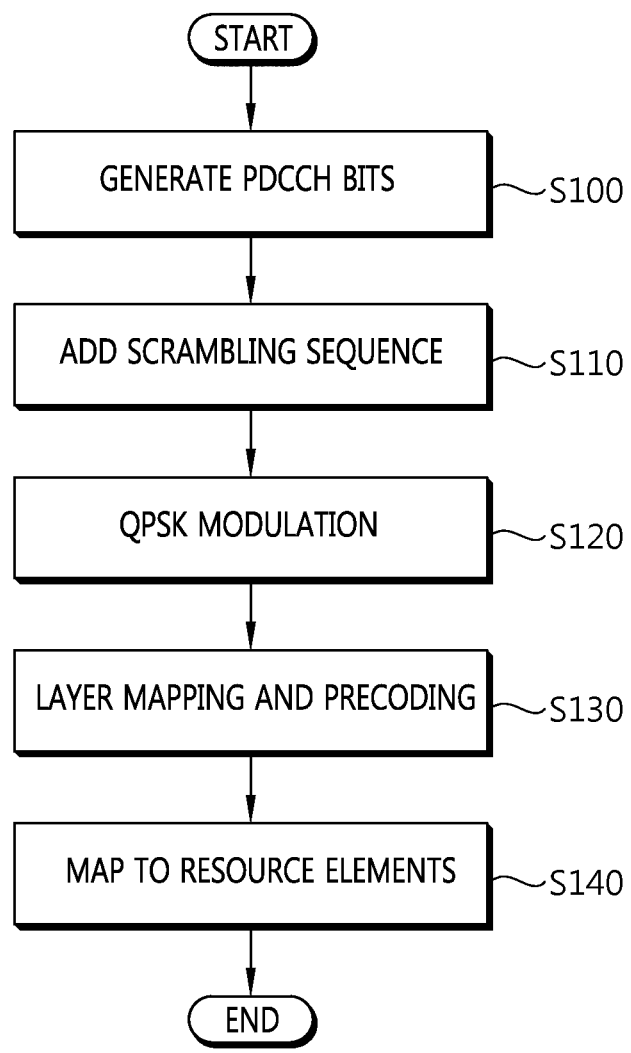
FIG. 7 shows an example of a process in which a PDCCH is mapped to resources.

FIG. 7 shows an example of a process in which a PDCCH is mapped to resources.

In step S100, a PDCCH bit is generated. The PDCCH bit may be denoted by the Equation 1 below.

$$b^{(0)}(0), \ldots, b^{(0)}(M_{bit}^{(0)}-1), b^{(1)}(0), \ldots, b^{(1)}(M_{bit}^{(1)}-1), \ldots, b^{(nPDCCH-1)}(0), \ldots, b^{(nPDCCH-1)}(M_{bit}^{(nPDCCH-1)}-1)$$ <Equation 1>

$M_{bit}^{(i)}$ represents the number of bits transmitted on the number i of the PDCCH within a one subframe. nPDCCH represents the number of PDCCHs transmitted within the subframe.

In step S110, a scrambling sequence is added to the generated PDCCH bit. The PDCCH bit to which the scrambling sequence is added may be denoted by the Equation 2 below.

$$\tilde{b}(0), \ldots, \tilde{b}(M_{tot}-1), \tilde{b}(i)=(b(i)+c(i)) \bmod 2$$ <Equation 2>

In step, S120, QPSK modulation is performed on the PDCCH bit to which the scrambling sequence is added. The modulation symbols generated by the QPSK modulation may be denoted by $d(0), \ldots, d(M_{sym}b-1)$.

In step S130, A layer mapping and a precoding are performed on the modulation symbols. The modulation symbols in which the layer mapping and the precoding are performed may be denoted by the Equation 3 below.

$$y(i)=[y^{(0)}(i) \ldots y^{(P-1)}(i)]^T, i=0, \ldots, M_{symb}-1$$ <Equation 3>

In step S140, the modulation symbols in which the layer mapping and the precoding are performed are mapped to resource elements. That is, y(i) in the Equation 3 is mapped to the resources on an antenna port p. After performing the sub-block interleaving, the modulation symbols are mapped to the REGs in the order of time and frequency. The PDCCH is transmitted on a set of antenna port that is identical to the antenna port on which a physical broadcast channel (PBCH) is transmitted.

In general, a reference signal (RS) is transmitted as a sequence. Any sequence may be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Examples of the PN sequence include an m-sequence, a computer generated sequence, a Gold sequence, a Kasami sequence, etc. In addition, the RS sequence may be a cyclically shifted sequence.

A downlink RS may be classified into a cell-specific reference signal (CRS), a multimedia broadcast and multicast single frequency network (MBSFN) reference signal, a UE-specific reference signal, a positioning reference signal (PRS), and a channel state information reference signal (CSI RS). The CRS is an RS transmitted to all UEs in a cell, and is used in channel measurement for a channel quality indicator (CQI) feedback and channel estimation for a PDSCH. The MBSFN reference signal may be transmitted in a subframe allocated for MBSFN transmission. The UE-specific RS is an RS received by a specific UE or a specific UE group in the cell, and may also be called a demodulation reference signal (DMRS). The DMRS is primarily used for data demodulation of a specific UE or a specific UE group. The PRS may be used for location estimation of the UE. The CSI RS is used for channel estimation for a PDSCH of a LTE-A UE. The CSI RS is relatively sparsely deployed in a frequency domain or a time domain, and may be punctured in a data region of a normal subframe or an MBSFN subframe. If required, a channel quality indicator (CQI), a precoding matrix indicator (PMI), a rank indicator (RI), etc., may be reported from the UE through CSI estimation.

A CRS is transmitted from all of downlink subframes within a cell supporting PDSCH transmission. The CRS may be transmitted through antenna ports 0 to 3 and may be defined only for $\Delta f=15$ kHz. The CRS may be referred to Section 6.10.1 of 3GPP TS 36.211 V10.1.0 (2011-03).

Figure 8:
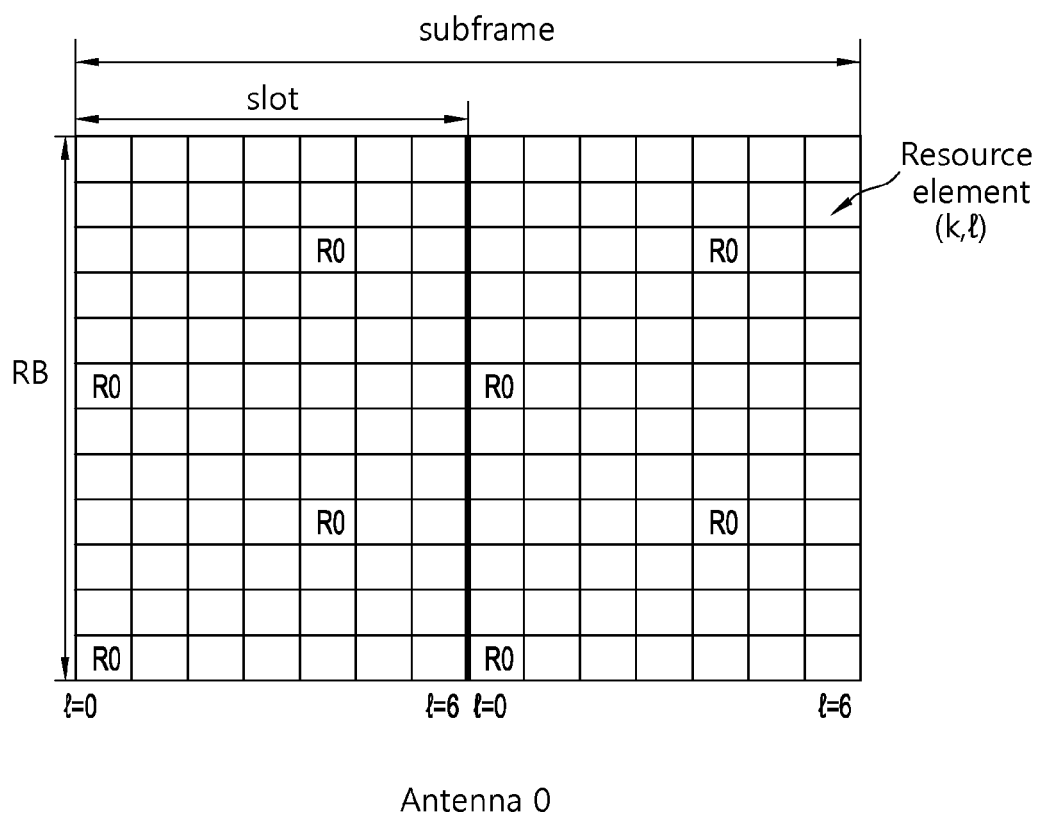
FIGS. 8 to 10 show examples of an RB to which a CRS is mapped.
Figure 9:
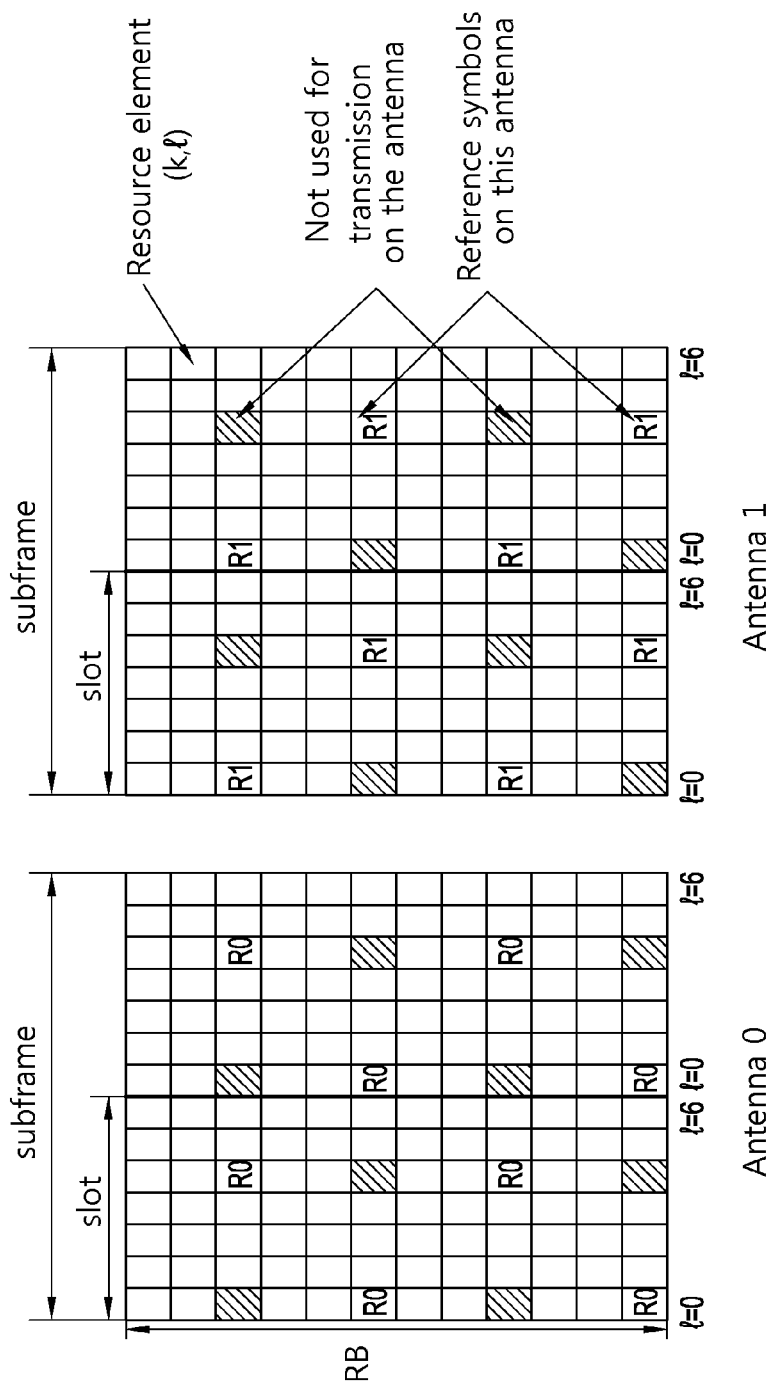
Figure 10:
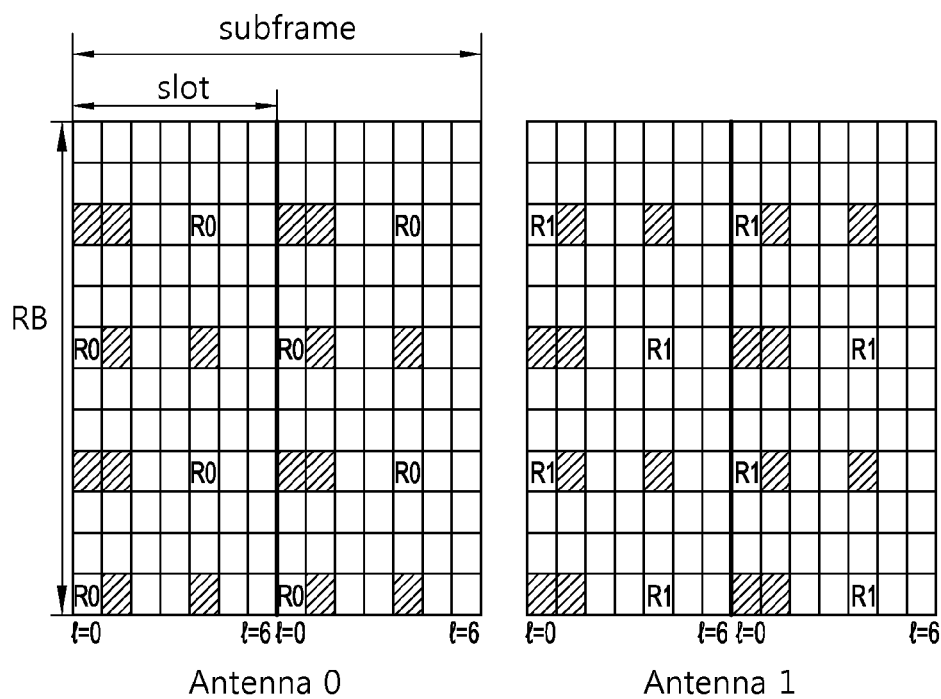
Figure 10:
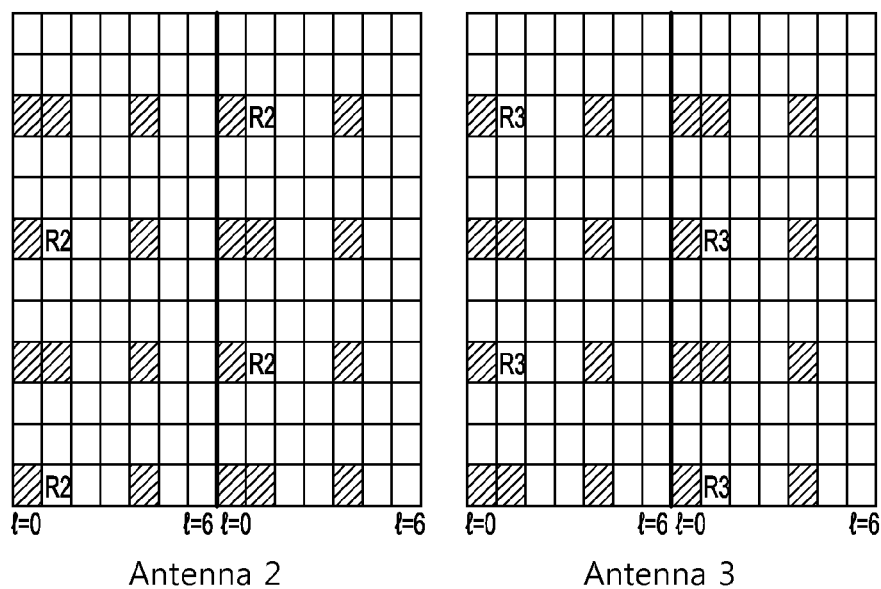

FIGS. 8 to 10 show examples of an RB to which a CRS is mapped.

FIG. 8 shows one example of a pattern in which a CRS is mapped to an RB when a base station uses a single antenna port. FIG. 9 shows one example of a pattern in which a CRS is mapped to an RB when a base station uses two antenna ports. FIG. 10 shows one example of a pattern in which a CRS is mapped to an RB when a base station uses four antenna ports. The CRS patterns may be used to support features of the LTE-A. For example, the CRS patterns may be used to support coordinated multi-point (CoMP) transmission/reception technique, spatial multiplexing, etc. Also, the CRS may be used for channel quality measurement, CP detection, time/frequency synchronization, etc.

Referring to FIGS. 8 to 10, in case the base station carries out multiple antenna transmission using a plurality of antenna ports, one resource grid is allocated to each antenna port. 'R0' represents a reference signal for a first antenna port. 'R1' represents a reference signal for a second antenna port. 'R2' represents a reference signal for a third antenna port. 'R3' represents a reference signal for a fourth antenna port. Positions of R0 to R3 within a subframe do not overlap with each other. l, representing the position of an OFDM symbol within a slot, may take a value ranging from 0 to 6 in a normal CP. In one OFDM symbol, a reference signal for each antenna port is placed apart by an interval of six subcarriers. The number of R0 and the number of R1 in a subframe are the same to each other while the number of R2 and the number of R3 are the same to each other. The number of R2 or R3 within a subframe is smaller than the number of R0 or R1. A resource element used for a reference signal of one antenna port is not used for a reference signal of another antenna port. This is intended to avoid generating interference among antenna ports.

The CRSs are always transmitted as many as the number of antenna ports regardless of the number of streams. The CRS has a separate reference signal for each antenna port. The frequency domain position and time domain position of the CRS within a subframe are determined regardless of UEs. The CRS sequence multiplied to the CRS is also generated regardless of UEs. Therefore, all of UEs within a cell may receive the CRS. However, it should be noted that the CRS position within a subframe and the CRS sequence may be determined according to cell IDs. The time domain position of the CRS within a subframe may be determined according to an antenna port number and the number of OFDM symbols within a resource block. The frequency domain position of the CRS within a subframe may be determined according to an antenna port number, cell ID, OFDM symbol index (l), a slot number within a radio frame, etc.

A two-dimensional CRS sequence may be generated by multiplication between symbols of a two-dimensional orthogonal sequence and symbols of a two-dimensional pseudo-random sequence. There may be three different two-dimensional orthogonal sequences and 170 different two-dimensional pseudo-random sequences. Each cell ID corresponds to a unique combination of one orthogonal sequence and one pseudo-random sequence. In addition, frequency hopping may be applied to the CRS. The period of frequency hopping pattern may be one radio frame (10 ms), and each frequency hopping pattern corresponds to one cell identity group.

A DMRS supports for PDSCH transmission, and is transmitted on the antenna port $p=5$, $p=$, 8 or $p=7, 8, \ldots, v+6$. At this time, v represents the number of layers used for PDSCH transmission. The DMRS is transmitted to one UE through any of the antenna ports belonging to a set S, where S={7, 8, 11, 13} or S={9, 10, 12, 14}. The DMRS is defined for demodulation of PDSCH and valid only when transmission of PDSCH is associated with the corresponding antenna port. The DMRS is transmitted only from a RB to which the corresponding PDSCH is mapped. The DMRS, regardless of the antenna port, is not transmitted in a resource element to which either of a physical channel and a physical signal is transmitted. The DMRS may be referred to Section 6.10.3 of 3GPP TS 36.211 V10.1.0 (2011-03).

Figure 11:
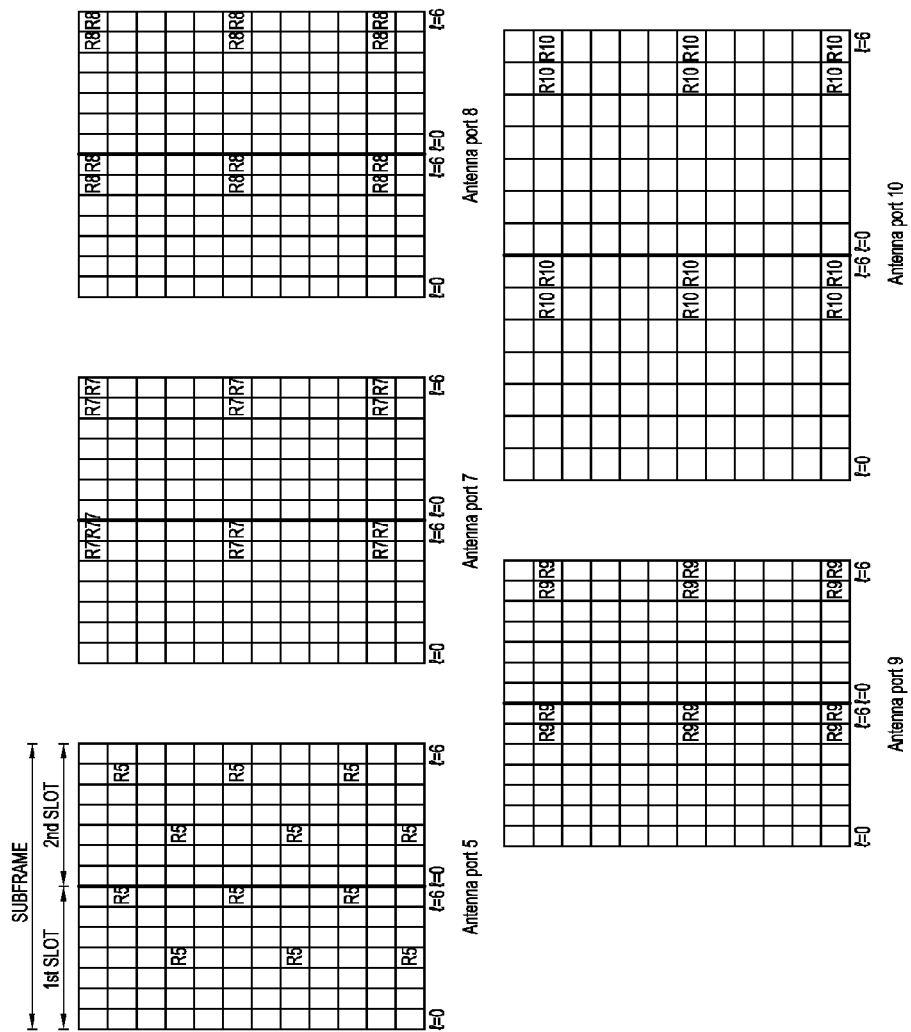
FIG. 11 shows an example of an RB to which a DMRS is mapped.

FIG. 11 shows an example of an RB to which a DMRS is mapped.

FIG. 11 shows resource elements used for the DMRS in a normal CP structure. Rp denotes resource elements used for DMRS transmission on an antenna port p. For example, R5 denotes resource elements used for DMRS transmission on an antenna port 5. Also, referring to FIG. 11, the DMRS for an antenna port 7 and 8 are transmitted through resource elements corresponding to a first, sixth, and eleventh sub-carriers (subcarrier index 0, 5, 10) of a sixth and seventh OFDM symbol (OFDM symbol index 5, 6) for each slot. The DMRS for the antenna port 7 and 8 may be identified by an orthogonal sequence of length 2. The DMRS for an antenna port 9 and 10 are transmitted through resource elements corresponding to a second, seventh, and twelfth sub-carriers (subcarrier index 1, 6, 11) of a sixth and seventh OFDM symbol (OFDM symbol index 5, 6) for each slot. The DMRS for the antenna port 9 and 10 may be identified by an orthogonal sequence of length 2. Since S={7, 8, 11, 13} or S={9, 10, 12, 14}, the DMRS for the antenna port 11 and 13 are mapped to resource elements to which the DMRS for the antenna port 7 and 8 are mapped, while the DMRS for the antenna port 12 and 14 are mapped to resource elements to which the DMRS for the antenna port 9 and 10 are mapped.

A CSI RS is transmitted through one, two, four, or eight antenna ports. The antenna ports used for each case is $p=15$, $p=15, 16$, $p=15, \ldots, 18$, and $p=15, \ldots, 22$, respectively. The CSI RS may be defined only $\Delta f=15$ kHz. The CSI RS may be referred to Section 6.10.5 of 3GPP TS 36.211 V10.1.0 (2011-03).

A CSI RS sequences may be based on a pseudo-random sequence which is generated from a seed based on a cell ID. Regarding transmission of the CSI RS, a maximum of 32 configurations different from each other may be taken into account to reduce inter-cell interference (ICI) in a multi-cell environment, including a heterogeneous network (HetNet) environment. The CSI RS configuration is varied according to the number of antenna ports within a cell and CP, and neighboring cells may have the most different configurations. Also, the CSI RS configuration may be divided into two types depending on a frame structure. The two types include a type applied to both of FDD frame and TDD frame and a type applied only to the TDD frame.

Figure 12:
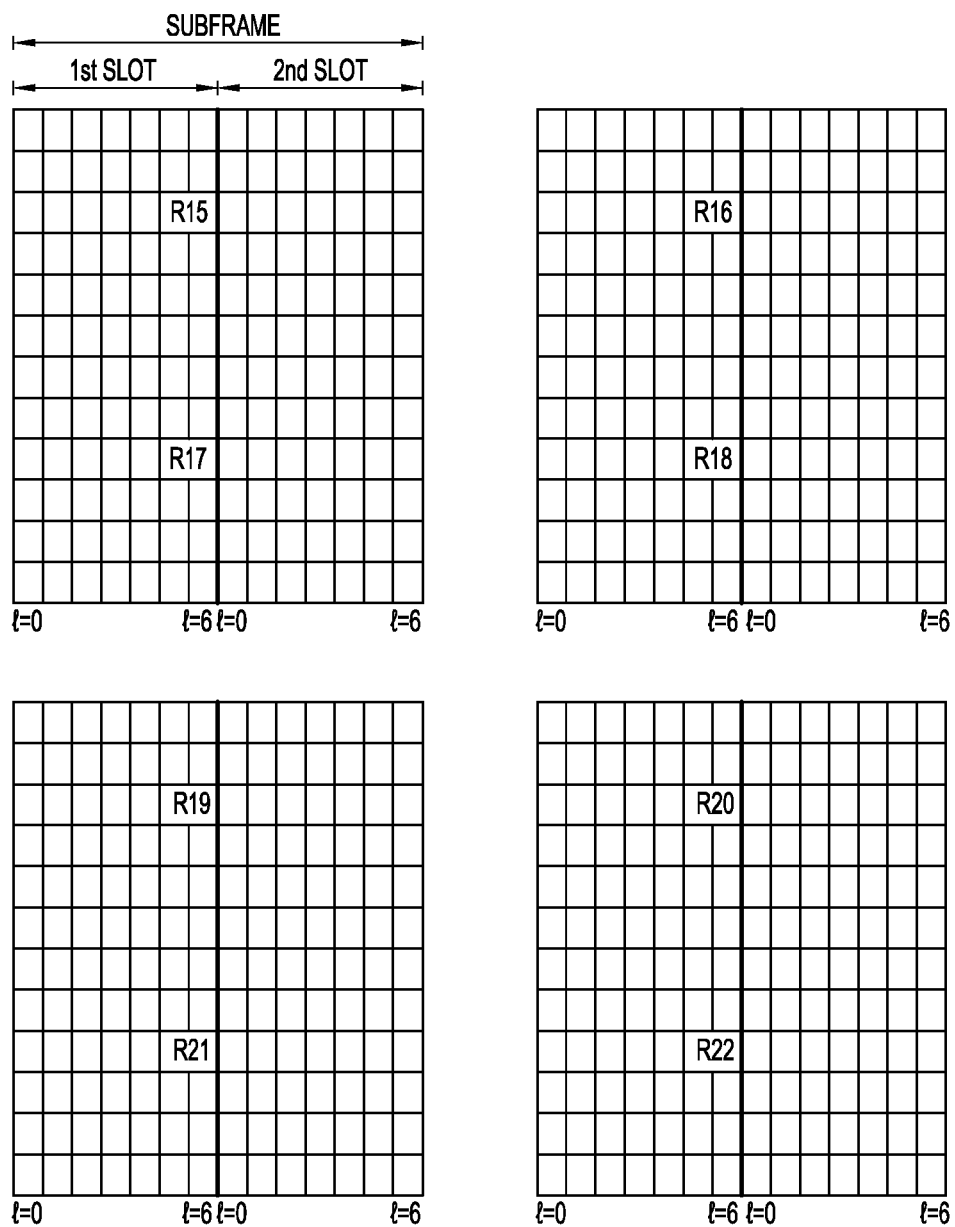
FIG. 12 shows an example of an RB to which a CSI-RS is mapped.

FIG. 12 shows an example of an RB to which a CSI-RS is mapped.

FIG. 12 shows resource elements used for the CSI-RS in a normal CP structure when CSI RS configuration index is zero. Rp denotes resource elements used for CSI-RS transmission on an antenna port p. Referring to FIG. 12, the CSI-RS for an antenna port 15 and 16 are transmitted through resource elements corresponding to a third subcarrier (subcarrier index 2) of a sixth and seventh OFDM symbol (OFDM symbol index 5, 6) of a first slot. The CSI-RS for an antenna port 17 and 18 is transmitted through resource elements corresponding to a ninth subcarrier (subcarrier index 8) of a sixth and seventh OFDM symbol (OFDM symbol index 5, 6) of the first slot. The CSI-RS for an antenna port 19 and 20 is transmitted through the same resource elements as the CSI-RS for an antenna port 15 and 16 is transmitted. The CSI-RS for an antenna port 21 and 22 is transmitted through the same resource elements as the CSI-RS for an antenna port 17 and 18 is transmitted.

Figure 13:
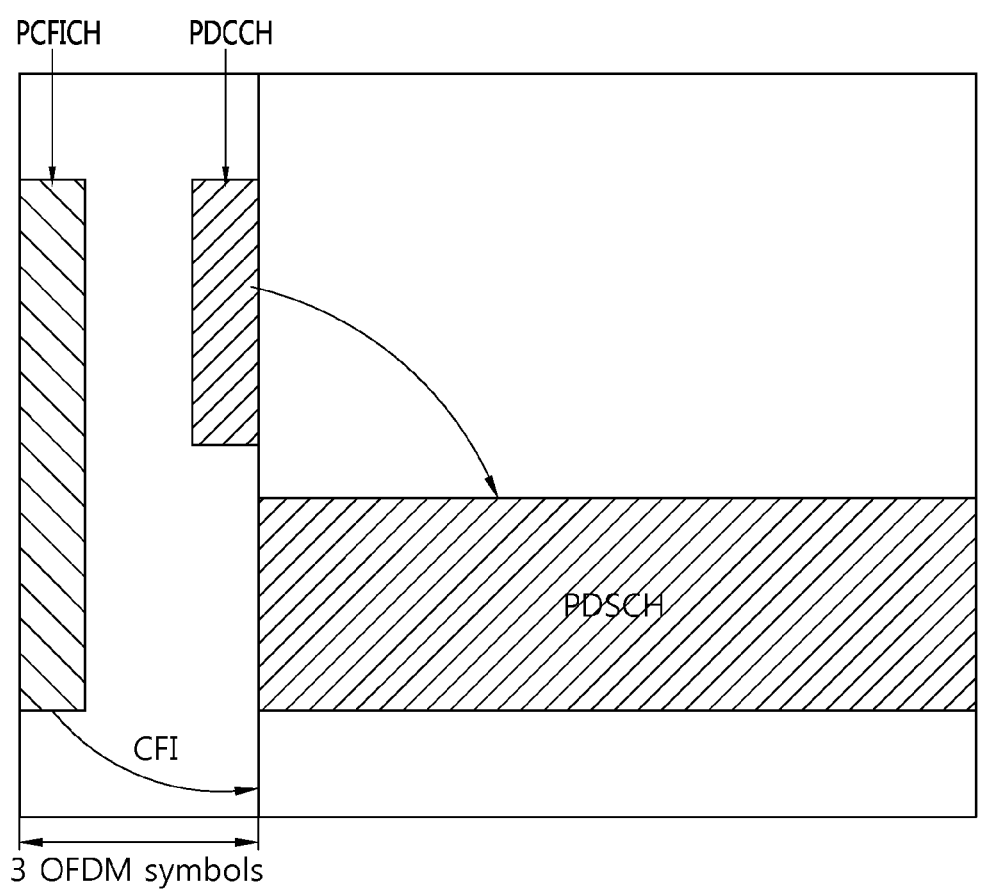
FIG. 13 shows an example where a PCFICH, PDCCH, and PDSCH are mapped to a subframe.

FIG. 13 shows an example where a PCFICH, PDCCH, and PDSCH are mapped to a subframe.

The 3GPP LTE allocates a PDCCH to transmit a downlink control signal intended for controlling UEs. The region to which PDCCHs of a plurality of UEs are mapped is called a PDCCH region or a control region. The PCFICH carries information about the number of OFDM symbols used for allocation of the PDCCH within a subframe. The information about the number of OFDM symbols to which the PDCCH is allocated is called a control formation indicator (CFI). All the UEs within a cell have to search the region to which the PDCCH is allocated, and accordingly, the CIF may be set to a cell-specific value. In general, the control region to which the PDCCH is allocated is allocated to the OFDM symbols at the forefront of a downlink subframe, and the PDCCH may be allocated to a maximum of three OFDM symbols.

Referring to FIG. 13, CIF is set to 3, and accordingly, the PDCCH is allocated to the aforementioned three OFDM symbols within a subframe. The UE detects its own PDCCH within the control region and finds its own PDSCH through the detected PDCCH in the corresponding control region.

The PDCCH in the prior art was transmitted by using transmission diversity in a confined region and does not employ various techniques supporting the PDSCH such as beamforming, multi-user multiple-input multiple-output (MU-MIMO), and best band selection. Also, in case a distributed multi-node system is introduced for system performance enhancement, capacity of the PDCCH becomes short if cell IDs of a plurality of nodes or a plurality of RRHs are identical to each other. Therefore, a new control channel may be introduced in addition to the existing PDCCH. Hereinafter, a control channel newly defined is called an enhanced PDCCH (e-PDCCH). In the description below, e-PDCCH may be used mixed with an ePDCCH or EPDCCH. The e-PDCCH may be allocated in a data region rather than the existing control region. As the e-PDCCH is defined, a control signal for each node is transmitted for each UE, and the problem of shortage of the PDCCH region can be solved.

As the control region to which the PDCCH is allocated is specified by the PCFICH, a new channel specifying a region to which the e-PDCCH is allocated may be defined. In other words, an enhanced PCFICH (e-PCFICH) may be newly defined, which specifies a region to which the e-PDCCH is allocated. The e-PCFICH may carry part or all of information required for detecting the e-PDCCH. The e-PDCCH may be allocated to a common search space (CSS) within the existing control region or a data region.

Figure 14:
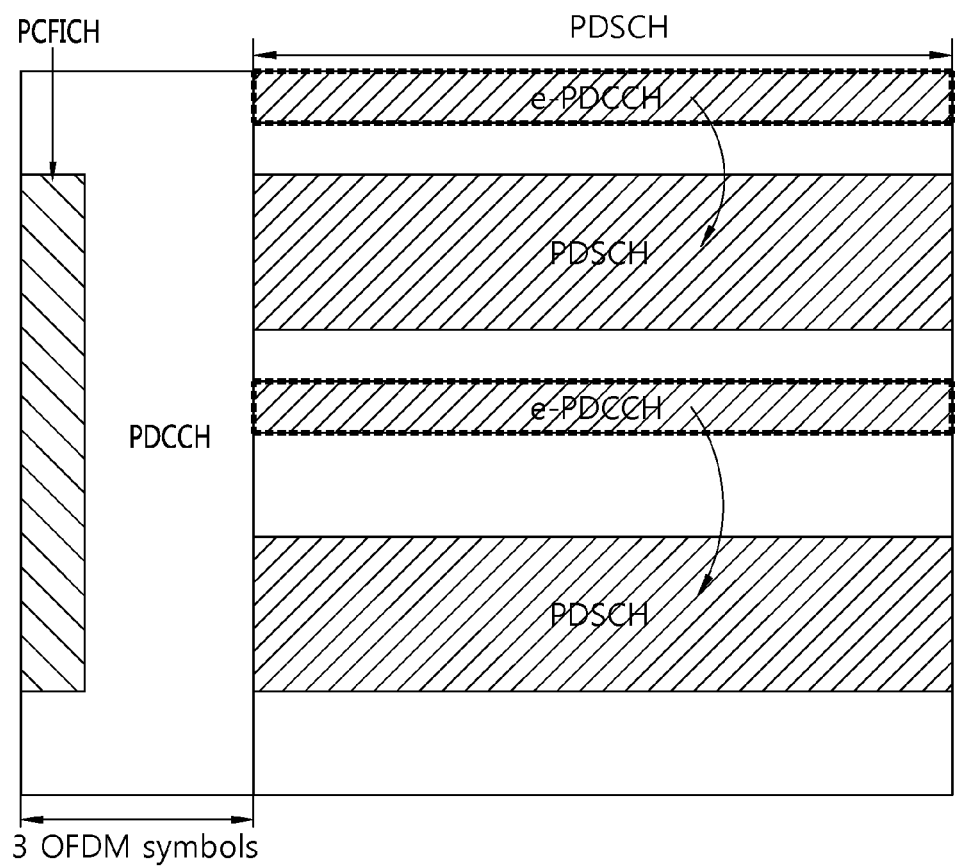
FIG. 14 shows an example of resource allocation through an e-PDCCH.

FIG. 14 shows an example of resource allocation through an e-PDCCH.

The e-PDCCH may be allocated to part of a data region rather than the conventional control region. The e-PDCCH is not provided for the existing legacy UEs, and those UEs supporting the 3GPP LTE rel-11 (hereinafter, they are called rel-11 UEs) may search for the e-PDCCH. The rel-11 UE performs blind decoding for detection of its own e-PDCCH. The information about the minimum region required for detection of the e-PDCCH may be transmitted through a newly defined e-PCFICH or the existing PDCCH. A PDSCH may be scheduled by the e-PDCCH allocated to the data region. A base station may transmit downlink data to each UE through the scheduled PDSCH. In FIG. 14, it is exemplified that the e-PDCCH schedules a PDSCH in the same subframe, but e-PDCCH may schedule a PDSCH allocated to another subframe. However, if the number of UEs connected to each node is increased, the portion of the data region occupied by the e-PDCCH is enlarged. Therefore, the number of blind decoding that has to be performed by the UE is also increased, thus increasing degree of complexity.

Meanwhile, wireless communication systems including relay stations are under development recently. A relay station is intended to extend cell coverage and improve transmission performance. A base station may achieve an effect of extending cell coverage by servicing UEs located at the boundaries of the base station through the relay station. Also, as the relay station improves reliability of signal transmission between the base station and UEs, transmission capacity may be increased. The relay station may be utilized in such a case where a UE is located in a shadow region though the UE may stay within coverage of the base station. The uplink and the downlink between the base station and the relay station are backhaul links while the uplink and the downlink between the base station and a UE, or between the relay station and a UE are access links. Hereinafter, a signal transmitted through the backhaul link is called a backhaul signal, and a signal transmitted through the access link is called an access signal.

Relay zones may be defined in a wireless communication system including relay stations. A relay zone refers to an interval within a downlink subframe transmitted by a base station, where transmission of a control channel (hereinafter, R-PDCCH) for a relay station or transmission of a data channel (hereinafter, R-PDSCH) for the relay station is performed. In other words, the relay zone indicates an interval within a downlink subframe, where backhaul transmission is performed. Transmission between the base station and the relay station is restricted only in the relay zone within a slot. A PDSCH for transmission between the base station and the relay station is processed in the same way as the PDSCH is processed when the relay station is not employed, and the processed PDSCH is mapped to resource elements. However, the corresponding PDSCH is mapped only to the resource elements within the relay region, and if the R-PDCCH is allocated to a first slot of an RB pair, the corresponding PDSCH is not mapped to the first slot of the RB pair.

The R-PDCCH carries DCI for the relay station. The R-PDCCH may be allocated to OFDM symbols of a first slot ranging from the fourth to the last OFDM symbol or OFDM symbols of a second slot ranging from the first to the last OFDM symbol. In frequency domain, a plurality of virtual RBs (VRBs) to which the R-PDCCH can be allocated may be configured by a higher layer. Without being cross-interleaved with other R-PDCCHs in a given physical RB (PRB), the R-PDCCH may be transmitted on one or more PRBs. In other cases, a plurality of R-PDCCHs may be cross-interleaved with each other in one or more PRBs.

Figure 15:
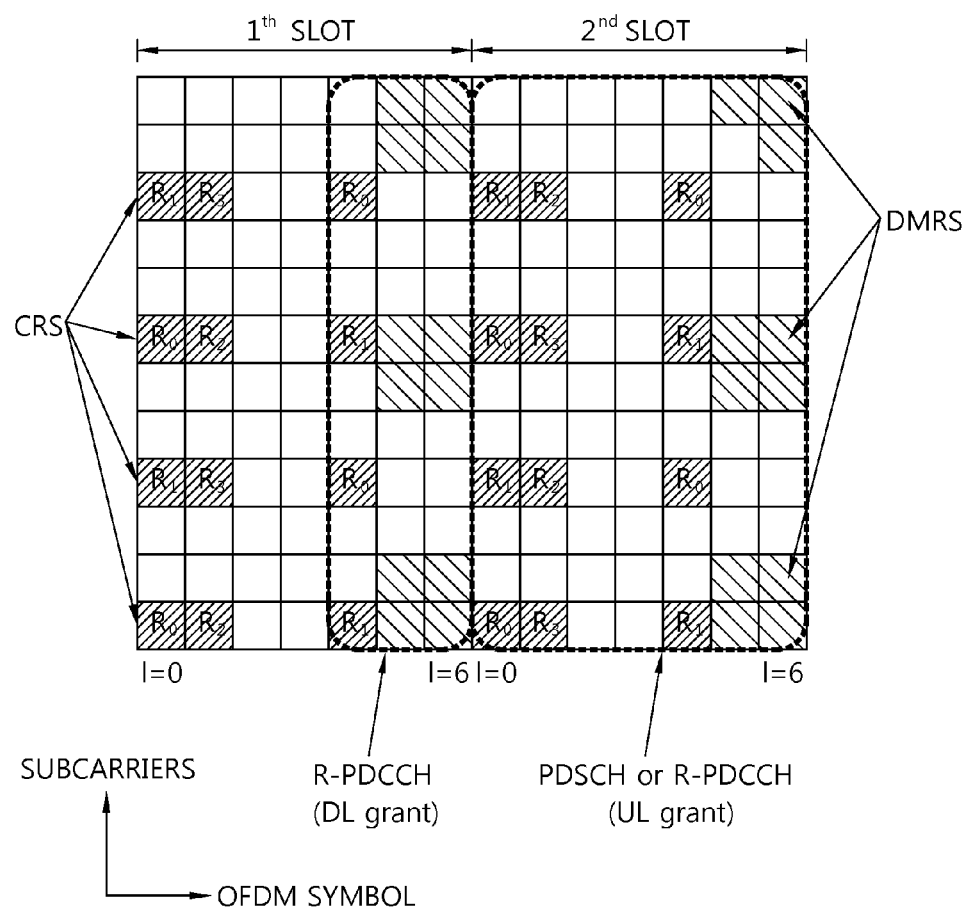
FIG. 15 shows an example of an R-PDCCH allocated to an RB.

FIG. 15 shows an example of an R-PDCCH allocated to an RB.

Referring to FIG. 15, only a DL grant is allocated to a first slot of the RB, and a UL grant or a PDSCH is allocated to a second slot. In this case, the R-PDCCH may be allocated to the remaining REs other than the REs to which a control region, CRS, and DMRS are mapped. Both of the CRS and DMRS may be used for demodulation of the R-PDCCH. If the DMRS is used for demodulation of the R-PDCCH, the antenna port 7 and a scrambling ID (SCID) of 0 may be used. On the other hand, if the CRS is used for demodulation of the R-PDCCH, the antenna port 0 may be used when only one PBCH transmission antenna is employed, whereas if two or four PBCH transmission antennas are used, Tx diversity mode is activated, and antenna ports 0-1 or 0-3 may be utilized.

In allocating an e-PDCCH newly defined for a multi-node system, the structure of the existing R-PDCCH described in FIG. 15 may be re-used. In other words, only the DL grant may be allocated to the first slot in the RB, and the UL grant or the PDSCH may be allocated in the second slot. Also, the e-PDCCH may be allocated to the remaining REs other than the REs to which the control region, CRS, and DMRS are mapped. By adopting the existing structure, the e-PDCCH may be allocated without exerting a large influence on the existing standards.

Hereinafter, a method for transmitting a reference signal according to an embodiment of the present invention is described.

An e-PDCCH may be allocated to a plurality of PRBs. Each e-PDCCH may be allocated in a localized manner within a plurality of PRBs. In other words, e-PDCCHs may be allocated being adjacent to each other in the time domain or frequency domain. Likewise, each e-PDCCH may be allocated in a distributed manner within a plurality of PRBs. In other words, e-PDCCHs may be allocated being physically distributed across the time domain or frequency domain.

Allocation of e-PDCCHs in a localized manner within a plurality of PRBs may be interpreted that an e-PDCCH of a minimum aggregate level (aggregate level 1) is transmitted from one PRB or a PRB pair. Hereinafter, it is assumed that the region in which e-PDCCHs of a minimum aggregate level are transmitted from one PRB or a PRB pair is a first region. Allocation of e-PDCCHs in a distributed manner within a plurality of PRBs may be interpreted that e-PDCCHs of a minimum aggregate level are transmitted being divided from a plurality of PRBs or a PRB pair. Hereinafter, it is assumed that the region in which e-PDCCHs of a minimum aggregate level are transmitted being divided from a plurality of PRBs or a PRB pair is called a second region. Meanwhile, the region to which a plurality of e-PDCCHs is allocated may physically correspond to one region, or two or more regions. If an e-PDCCH is allocated over two or more regions, individual e-PDCCHs allocated to the respective region may be configured by the same method or by methods different from each other.

If a plurality of e-PDCCHs is allocated through the first region, the plurality of e-PDCCHs may be allocated to frequency bands (PRBs or logical RBs) different from each other. To this end, a base station may allocate e-PDCCH ports, which are antenna ports to be used by the respective e-PDCCHs, to the corresponding UEs, or inform the UEs about a candidate group of the e-PDCCH ports. An e-PDCCH port may use the same resource elements as the aforementioned DMRS. But the e-PDCCH port may be different antenna port from the DMRS port. In case a candidate group of e-PDDCH ports are informed to each UE, there is no need to allocate an e-PDCCH for each and every UE, and pairing such as the one based on MU-MIMO mechanism may be carried out relatively freely. The candidate group of e-PDCCH ports may be predefined or informed by signaling through a higher layer.

If a plurality of e-PDCCHs is allocated through the second region, e-PDCCHs for various UEs may be transmitted together in one PRB or one PRB pair. Therefore, e-PDCCH ports for individual e-PDCCHs cannot be allocated separately. In this case, a common e-PDCCH port may be allocated to be used for a plurality of e-PDCCHs allocated in the second region. One or more common e-PDCCH ports may be allocated to this purpose. For example, antenna port 7 may be allocated as a common e-PDCCH port. In case the second region comprises a plurality of RBs, a plurality of e-PDCCH ports may be allocated according to a predetermined order for each RB. Similarly, in case the second region comprises a plurality of RBs and each RB comprises a plurality of e-PDCCH units, a plurality of e-PDCCH ports may be allocated according to a predetermined order for each e-PDCCH unit. The plurality of e-PDCCH ports allocated in this manner may be indicated beforehand or signaled through a higher layer. In other case, the base station may inform the UE about a candidate group of e-PDCCH ports that may be allocated, and the UE may figure out the e-PDCCH port allocated to the UE through blind decoding.

A method for a base station to inform a candidate group of e-PDCCH ports is described in more detail. To maximize re-use of limited DMRS ports and reduce indication overhead, the base station may inform the UE about a candidate group of e-PDCCH ports and/or a candidate group of DMRS ports, which is for a PDSCH, through a PDCCH or RRC signaling. For example, the base station may define a new RRC message such as an e-PDCCH port candidate set information element (IE) or a DMRS port candidate set IE, and may inform the UE about a candidate group of e-PDCCH ports for an e-PDCCH and/or a candidate group of DMRS ports for a PDSCH, separately or together. As another example, the base station may define a new RRC message such as an e-PDCCH configuration IE which informs configuration information of an e-PDCCH and incorporate a DMRS port candidate set field into the RRC message. The DMRS port candidate set field may indicate only the candidate group of e-PDCCH ports. At this time, the candidate group of e-PDCCH ports may include the e-PDCCH ports for e-PDCCHs allocated to the first region and/or the second region. Similarly, the DMRS port candidate set field may indicate not only the candidate group of e-PDCCH ports but also the candidate group of DMRS ports for a PDSCH.

The UE may perform blind decoding of the e-PDCCH by using DMRSs received through e-PDCCH ports belonging to a candidate group of e-PDCCH ports. If the PDSCH and the e-PDCCH use the same candidate group of antenna ports, the e-PDCCH may be some of the antenna ports belonging to the candidate group. For example, the e-PDCCH ports may comprise those antenna ports with a smaller antenna port index among the candidate group of antenna ports. Similarly, the e-PDCCH ports may comprise N antenna ports taken in the order as arranged in the candidate group of antenna ports or N antenna ports taken in the order as determined in association with CSI-RS composition indices.

Also, the UE may perform decoding of the PDSCH by using DMRSs received through antenna ports belonging to a candidate group of antenna ports. If a part of the received DMRSs are used to decode the PDSCH, the UE may perform decoding of the PDSCH by using e-PDCCH ports used for decoding the e-PDCCH and additionally by using one or more DMRS ports. Likewise, the UE may perform decoding of the PDSCH by using specific DMRS ports specified from the e-PDCCH ports which have succeeded in decoding of the e-PDCCH. At this time, the specific DMRS ports specified from the e-PDCCH ports may correspond to as many DMRS ports as the number of ranks determined according to a sequential order or a predefined order of the e-PDCCH port indices. Also, the UE may figure out the DMRS ports for decoding of the PDSCH by decoding the e-PDCCH through the e-PDCCH ports. At this time, the UE may obtain a DMRS port index by decoding the e-PDCCH, or may obtain an index or a bitmap indicating which DMRS port among the candidate group of antenna ports is used to decode the PDSCH. If it is the case that an antenna port which has been used as the e-PDCCH port is again used for decoding the PDSCH, it is not necessary to obtain information about the corresponding antenna port.

Figure 16:
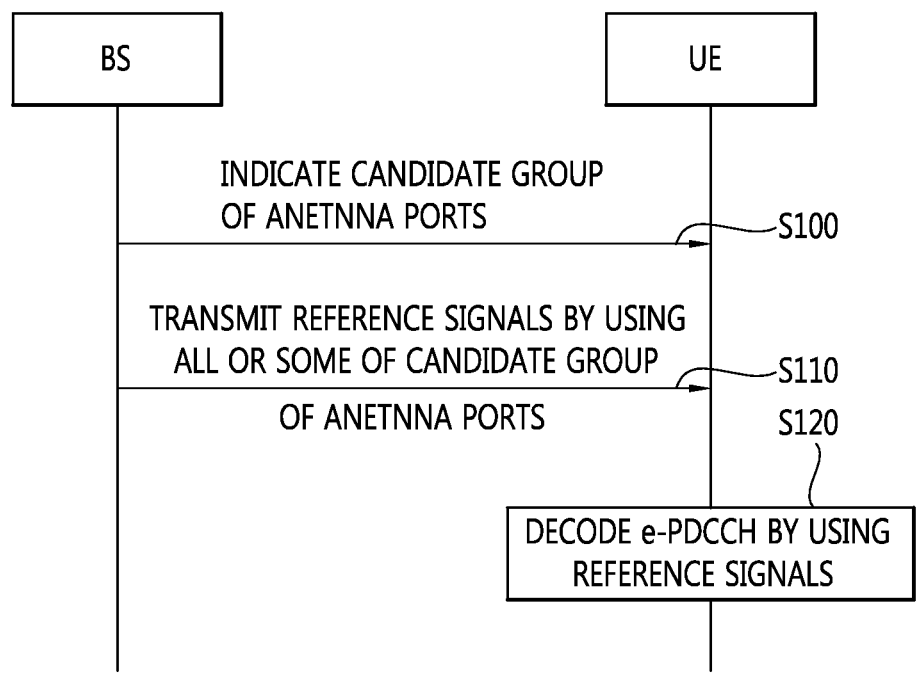
FIG. 16 shows an example of a method for transmitting a reference signal according to an embodiment of the present invention.

FIG. 16 shows an example of a method for transmitting a reference signal according to an embodiment of the present invention.

In step S100, the base station transmits to the UE a candidate group of antenna ports including a plurality of antenna ports. In step S110, the base station transmits a reference signal to the UE on all or some of the plurality of antenna ports included in the candidate group of antenna ports. In step S120, the UE, based on the received reference signal, performs blind decoding of the e-PDCCH configured within the PDSCH region.

Figure 17:
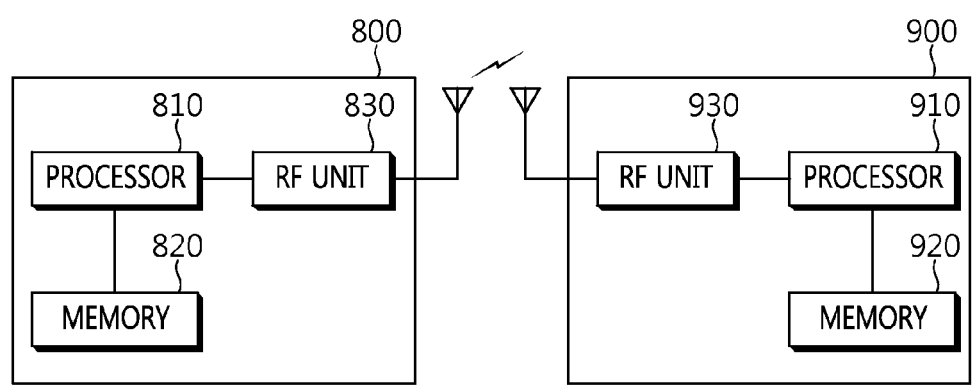
FIG. 17 is a block diagram showing wireless communication system to implement an embodiment of the present invention.

FIG. 17 is a block diagram showing wireless communication system to implement an embodiment of the present invention.

A BS 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 includes a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for decoding, by a user equipment, a channel in a wireless communication system, the method comprising:
receiving, from a base station, a candidate group of antenna ports including a plurality of antenna ports,
wherein the plurality of antenna ports include enhanced physical downlink control channel (e-PDCCH) ports and demodulation reference signal (DMRS) ports, and the e-PDCCH ports are N antenna ports taken in the order as determined in association with Channel State Information Reference Signal (CSI-RS) configuration indices, and the DMRS ports are antenna ports designated from the e-PDCCH ports that succeeded in blind decoding of the e-PDCCH;
receiving, from the base station, a reference signal on receiver ports corresponding to all or some of the plurality of antenna ports included in the candidate group of antenna ports, the receiver ports including the e-PDCCH ports and the DMRS ports;
performing blind decoding of an e-PDCCH, configured within a physical downlink shared channel (PDSCH) region, based on the received reference signal on the e-PDCCH ports; and
performing blind decoding of a PDSCH based on the received reference signal on the DMRS ports.

2. The method of claim 1, wherein the candidate group of antenna ports are received through a PDCCH or a radio resource control (RRC).

3. The method of claim 1, wherein the e-PDCCH is configured in a first region within the PDSCH region in which an e-PDCCH of a minimum aggregation level is transmitted from one physical resource block (PRB) or a PRB pair.

4. The method of claim 1, wherein the e-PDCCH is configured in a second region within the PDSCH region in which an e-PDCCH of a minimum aggregation level is transmitted being divided from a plurality of PRBs or a PRB pair.

5. The method of claim 1, wherein the reference signal is a DMRS.

6. The method of claim 1, wherein the DMRS ports include the e-PDCCH ports.

7. The method of claim 1, wherein a number of the DMRS ports is a number of ranks according to a sequential order of e-PDCCH port indices.

8. The method of claim 1, wherein information on the DMRS port is obtained from blind decoding of the e-PDCCH.

9. A user equipment (UE) in a wireless communication system, the UE comprising:
- a radio frequency (RF) unit for transmitting or receiving a radio signal; and
- a processor connected to the RF unit, and configured to:
  - receive, from a base station, a candidate group of antenna ports including a plurality of antenna ports, wherein the plurality of antenna ports include enhanced physical downlink control channel (e-PDCCH) ports and demodulation reference signal (DMRS) ports, and the e-PDCCH ports are N antenna ports taken in the order as determined in association with Channel State Information Reference Signal (CSI-RS) configuration indices, and the DMRS ports are antenna ports designated from the e-PDCCH ports that succeeded in blind decoding of the e-PDCCH;
  - receive, from the base station, a reference signal on receiver ports corresponding to all or some of the plurality of antenna ports included in the candidate group of antenna ports, the receiver ports including the e-PDCCH ports and the DMRS ports; and
  - perform blind decoding of an e-PDCCH, configured within a physical downlink shared channel (PDSCH) region, based on the received reference signal on the e-PDCCH ports, and
  - perform blind decoding of a PDSCH based on the received reference signal on the DMRS ports.

* * * * *